United States Patent
Kurita et al.

[11] Patent Number: 5,852,596
[45] Date of Patent: Dec. 22, 1998

[54] ADJUSTING A DETECTED SIGNAL WITH A WAVE FORM EQUALIZER BASED UPON ENVIRONMENTAL TEMPERATURE OR HEAT CHARACTERISTIC OF AN OPTICAL DISK

[75] Inventors: Shinichi Kurita, Yokohama; Hiroyuki Matsumoto; Masashi Horikawa, both of Tokyo; Koichiro Ishii, Zushi, all of Japan

[73] Assignee: Nikon Corporation, Japan

[21] Appl. No.: 662,668

[22] Filed: Jun. 14, 1996

[30] Foreign Application Priority Data

Jun. 15, 1995  [JP]  Japan ................................. 7-149175

[51] Int. Cl.$^6$ ................................. G11B 11/10
[52] U.S. Cl. .................. 369/120; 369/44.32; 369/54; 369/59; 369/116; 369/124
[58] Field of Search ................. 369/54, 59, 44.27, 369/44.34, 121, 13, 100, 116, 120, 44.32, 124

[56] References Cited

U.S. PATENT DOCUMENTS

| 5,177,726 | 1/1993 | Terada ........................................ 369/54 |
| 5,329,512 | 7/1994 | Fukimoto et al. ....................... 369/116 |
| 5,404,346 | 4/1995 | Koyama et al. ........................... 369/54 |
| 5,546,367 | 8/1996 | Yoshimura et al. ................. 369/44.32 |
| 5,631,891 | 5/1997 | Moritsugu et al. ..................... 369/124 |

FOREIGN PATENT DOCUMENTS

8-147707  6/1996  Japan .

*Primary Examiner*—Georgia Y. Epps
*Assistant Examiner*—Kim-Kwok Chu
*Attorney, Agent, or Firm*—Woodcock Washburn Kurtz Mackiewicz & Norris LLP

[57] ABSTRACT

The current invention is directed to an optical storage medium system and a method for adjusting an electrically converted optical signal representing the stored data based upon the environmental or optical disk temperature and/or a heat characteristics of the optical disk.

22 Claims, 4 Drawing Sheets

ADJUSTING A DETECTED SIGNAL WITH A WAVE FORM EQUALIZER BASED UPON ENVIRONMENTAL TEMPERATURE OR HEAT CHARACTERISTIC OF AN OPTICAL DISK

FIELD OF THE INVENTION

The current invention is generally related to a method and a system for adjusting an electrically converted input-output signal involving an optical storage medium and in particular related to a method and a system for adjusting a wave form equalizer according to an operational temperature for improved I/O operations.

BACKGROUND OF THE INVENTION

An optical disk system generally includes at least an optical disk medium, a laser light source and an input-output (I/O) controller unit. The optical disk medium stores information by changing the surface characteristics for the incident laser light so that the reflected light can be converted into electrical signals corresponding to the stored information. The optical disk system also includes an optical pick up unit and a servo device for moving the pick up unit over the disk surface. The I/O controller unit coordinates the activation and the deactivation of the above described components.

Figure 1:
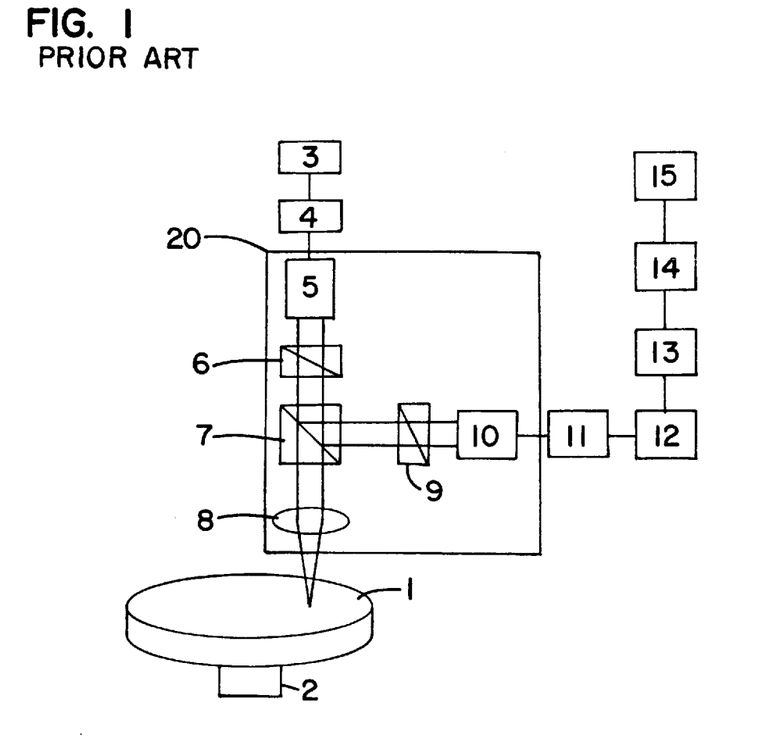
FIG. 1 is a block diagram illustrating a conventional optical storage system.

Referring to FIG. 1, certain components of an optical system are diagrammatically illustrated with a perspective view of an optical disk. The components include an optical disk 1, an optical pick-up unit 20, a servo controller 4 and a system input-output controller 3. The optical pick-up unit 20 further includes the laser source unit 5 for emitting a laser beam towards the optical disk 1 via a beam splitter 7 and an object lens 8. The optical disk is rotated at a predetermined RPM by a disk rotation motor 2.

Still referring to FIG. 1, the focused laser beam incident upon a track is reflected back towards the optical pick-up unit 20. The reflected laser beam is diverted from the original beam axis by the beam splitter 7 towards an optical detector 10 via a polarization unit 9 for generating an electrical signal. The electrically converted optical signal is sent to an amplification unit 11, and the amplified signal is further processed by a wave form equalizer 12, a shaping circuit unit 13, a discriminator unit 14 and a decoder unit 15.

Still referring to FIG. 1, read-write optical disks are generally optical in nature and include magneooptical disks and phase change optical disks. These optical disks are constructed to have predetermined data storage areas such as a land portion and a groove portion. In general, the land and groove portions are adjacently located spiral tracks and have a pitch ranging from approximately 1.0 $\mu$m to approximately 1.8 $\mu$m. In general, these two areas are constructed in such a way that the groove portion is located closer to the laser source unit than the land portion.

Either the land portion or the groove portion is used for storing data. For example, the land-based storage disk, the land portion is used as a track for storing data while the groove portion does not store data and is used for guiding the laser beam on the track. The width of the groove portion ranges from approximately 0.3 $\mu$m to approximately 0.6 $\mu$m. The depth d of the groove portion is generally related to the wavelength $\lambda$ of a laser beam to be used and a refraction index n of the optical disk medium and ranges from $\lambda/(4n)$ to $\lambda/(8n)$ In order to increase the memory capacity of the optical disk, the pitch of the tracks is decreased so that more tracks are defined per unit area. However, such thin tracks having a pitch of less than approximately 1.6 $\mu$m and contain thin and short marks. Since a diameter of the focused laser beam is larger than a single mark and extends over the adjacent marks, the laser beam cannot detect a single short mark. Consequently, the adjacent marks interfere with the reflection of the laser beam and cause a coding interference. To combat this problem, although a laser beam was narrowed, the diameter of the laser cannot resolve the above describe short marks.

In order to improve the decoding interference problem, a post processing is designed to minimize the interference from the adjacent short marks. In general, an amplitude of an electronically converted optical signal representing a short mark is smaller than that of a long mark. In other words, high frequency data generates a small amplitude signal than low frequency data. The amplitude difference in the electronically converted signals over a frequency range generally complicates the above described coding interference. Thus, a wave form equalizer selectively augments the amplitude of the high-frequency signal so as to equalize the amplitude of the frequency sensitive signals. Because the equalized amplitude signals are more easily demodulated based upon a common threshold, the wave equalizer substantially reduces the above described coding interference. However, since the optical encoding and decoding processes generally are temperature dependent, the wave form equalization fails to produce the consistent results over a temperature range.

To lay a foundation for the understanding of the above described inconsistency, the common principle of the optical I/O operations involves heating of the disk medium at predetermined temperatures and is referred to as a heat mode recording. To achieve the predetermined temperatures for recording, retrieving and erasing data on the optical disk, the strength of a laser beam is accordingly adjusted. At the recording strength, the penetrating laser beam generates sufficient energy in a recording layer of the optical disk to cause a change in certain phase shift or in an axis of magnetization. The change is referred to as a mark and signifies the recorded data. On the other hand, at the reading strength, the reflected laser beam should be strong enough to differentiate the marks from the non-marks so that a desirable carrier to noise ratio is ascertained. However, the reading laser strength should not change any marks. Lastly, the erasing laser strength should be somewhat stronger than the recording strength so that the existing marks are erased.

To meet the above described predetermined heat requirements for the I/O operations, there are at least three variables that affect the generation of a desired temperature in the recording layer of the optical disk. Firstly, the material composition of the optical disk varies from manufacturers to manufacturers. Secondly, as the laser beam is positioned on the optical disk surface to raise the temperature for performing a certain I/O operation, the disk is rotated at a constant angular velocity. However, because of the circular shape of the disk, between a peripheral region and a central region of the disk, the equivalent linear speed is different. Due to the different linear speed, a unit area in the peripheral and central regions receives a different amount of heat energy from the identical laser beam. Consequently, the laser beam at the same strength does not generate the same amount of heat in the peripheral region and the central region. Lastly, as described before, the operational temperature changes an amount of heat necessary to achieve a desired temperature in the recording layer.

In view of the above described factors and other factors for the heat recording mode, a processing of the electronically converted optical signal remains to be improved to produce a consistent result over a temperature range in the operating environment.

SUMMARY OF THE INVENTION

To solve the above and other problems, according to one aspect of the current invention, a method of fine-tuning input-output (I/O) operations involving an optical disk medium, includes the steps of: a) measuring an operational temperature; b) converting an optical signal representing data stored on the optical disk medium to an electrical signal; and c) adjusting the electrical signal generated in the step b) based upon the measured operational temperature.

According to a second aspect of the current invention, a method of adjusting input-output (I/O) operations involving an optical disk, includes the steps of: a) storing adjustment values; b) measuring an ambient temperature; c) retrieving information regarding the optical disk; d) selecting one of the adjustment values based upon a combination of the measured temperature and the retrieved disk information; e) converting an optical signal representing data stored on the disk into an electrical signal for a read operation; and f) adjusting the converted electrical signal based upon the selected adjustment value in the step d) so as to substantially optimize the read operation.

According to a third aspect of the current invention, a method of adjusting an electrical signal converted from an optical signal for representing data stored on an optical disk, includes the steps of: a) reading the data from the disk, a portion of the data including an adjustment value selected for the disk; and b) selectively increasing an amplitude of a high-frequency portion of the electrical signal based upon the adjustment value.

According to a fourth aspect of the current invention, a system for adjusting an electrically converted optical signal representing data on an optical disk medium, a laser beam source emitting a laser beam towards the optical disk medium for reading the data thereon, includes: a temperature measuring unit for measuring an operational temperature and generating a temperature signal based upon the measured operational temperature; a memory storage for containing a predetermined set of temperature specific adjustment values; an optical pick-up unit for receiving the laser beam reflected off a surface of the optical disk medium and converting the laser beam to the electrically converted optical signal defining an electrical signal; and a post-conversion processing unit connected to the optical pick-up unit, the temperature measuring unit and the memory storage for selecting one of the temperature specific adjustment values according the temperature signal and adjusting the electrical signal based upon the selected temperature adjustment value.

According to a fifth aspect of the current invention, a system for adjusting an electrically converted optical signal, includes: an optical disk medium storing data, a portion of data being information related to heat characteristics of the optical disk medium; a laser beam source emitting a laser beam towards the optical disk medium, the laser beam reflected off a surface of the optical disk medium representing data thereon; an optical pick-up unit for receiving the reflected laser beam and converting the reflected laser beam to an electrical signal; and a wave form equalizer connected to the optical pick-up unit for selectively adjusting the electrical signal based upon the heat characteristics information.

According to a sixth aspect of the current invention, an optical disk, includes: recordable data portions for storing data; and information storage portions for storing wave form equalization adjustment information for adjusting a wave form equalizer.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 2:
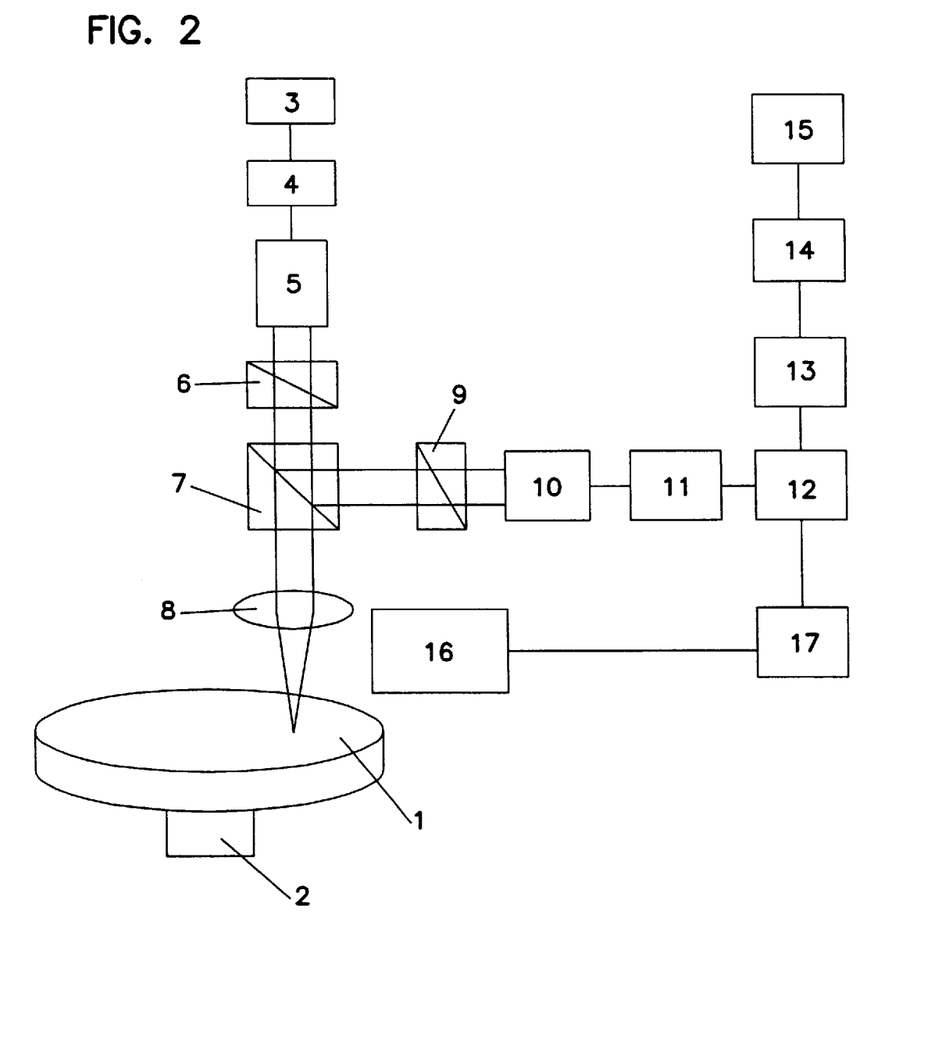
FIG. 2 is a block diagram illustrating one preferred embodiment of the system for optimizing an electronically converted optical signal according to the current invention.

Referring now to the drawings, wherein like reference numerals designate corresponding structure throughout the views, and referring in particular to FIG. 2, one preferred embodiment of an optical disk storage system according to the current invention is generally similar to the one as described in FIG. 1 in the Background section, and the descriptions of the identical components are not reiterated here. The optical disk 1 contains data to be retrieved. As described in the Background section, the retrieval operation are not as accurately and consistently performed when the environmental, operational or disk temperature of the system varies. As also described before, the inaccuracy is caused at least in part by the operational temperature effect on a wave form equalizer. In the following, the operational temperature is defined to include any temperatures that are related to the operation of the optical disk storage system or the environment where the optical disk storage system is placed.

To solve this problem, still referring to FIG. 2, according to the preferred embodiment of the current invention, the electrically converted optical signal is processed by a temperature-adjustable wave form equalizer 12. Before reaching the wave form equalizer 12, an optical signal is converted into an electrical signal by a detector 10 and the electrical signal is amplified by an amplifier 11. The wave form equalizer 12 also receives another input signal indicative of an wave form equalization adjustment value for adjusting the wave form equalization process from an equalization adjustment value specifying unit 17. In order to select an appropriate adjustment value for the equalization process, the equalization adjustment value specifying unit 17 stores a set of predetermined wave form equalization adjustment values and receives an input signal indicative of the environmental or operational temperature which is measured by a temperature measuring unit 16. Based upon the input temperature signal, the equalization adjustment value specifying unit 17 selects an appropriate equalization adjustment value. The wave form equalizer 12 adjusts a gain of high frequency signals according to the selected adjustment value so as to maintain the accuracy of the retrieval operation.

According to a second preferred embodiment of the current invention, in addition to the above described temperature dependent adjustment, an optical disk 1 contains certain wave form equalization information on the disk 1 for an additional adjustment during the wave form equalization process. As described above in the Background section, the optical disks 1 are made of a slightly different material depending on a manufacturer. In order to accommodate such a difference in heat characteristics, the disk 1 contains an adjustment value to be used by the wave form equalizer to compensate for the material difference. The above adjustment data is stored in the disk as marks for causing reflection changes upon an incident light or as pits having different depths.

In order to determine the above described wave form equalization adjustment values or adjusted wave form equalization gains, the following measurements are taken using a known optimal laser power. The optimal laser power is generally determined by recording a set of predetermined recording data on an optical disk, reading the recorded data from the disk and comparing the read data to the predetermined data so as to determine the accuracy of the I/O operation. After a predetermined set of known data is recorded on an optical disk at some levels near the optimal recording laser power, the recorded data is read at the operational temperatures of 10° C., 25° C. and 40° C. with various gains on the wave form equalize, and jitter margins are measured. The jitter margin is defined as a percentage value that is indicative of an amount of variation from the optimal recording laser power to cause a jitter exceeding a predetermined jitter value. In other words, the larger the jitter margin is, a better and more faithful recording has been made.

The following TABLE 1 shows some of the above described jitter margins:

| | Gains For Wave Form Equalizer | | |
|---|---|---|---|
| | 21% | 24% | 27% |
| 10° C. | ±16 | ±14 | ±10 |
| 25° C. | ±13 | ±16 | ±12 |
| 40° C. | ±11 | ±13 | ±16 |

Figure 3:
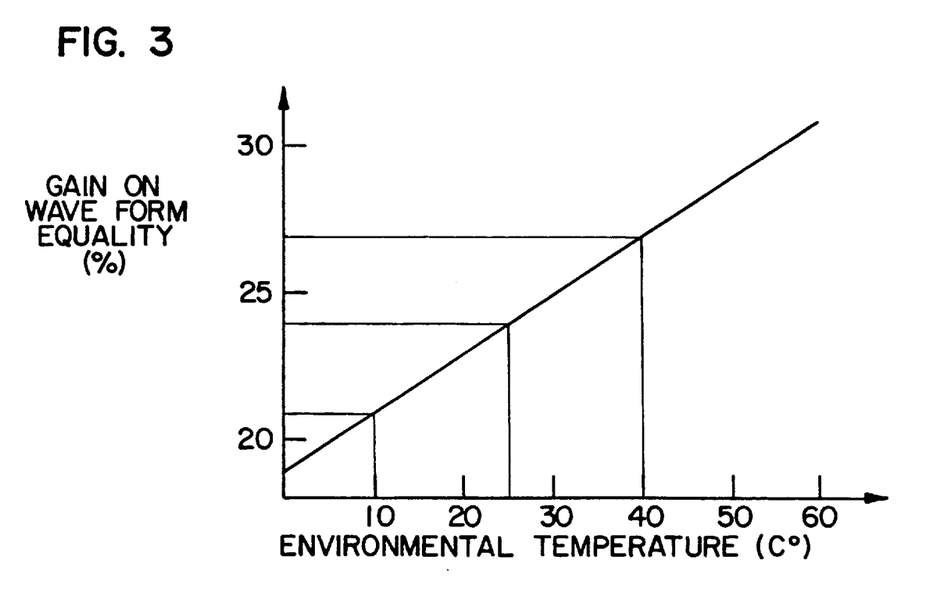
FIG. 3 is a graph indicating a relationship between the environmental temperature and the gain for optimizing the wave form equalization process.

As shown above in TABLE 1, for reading the data from the disk with the environmental temperature at 10° C., the maximum jitter margin is obtained when the gain is set to be 21%. Similarly, at 25° C. and 40° C., the maximum jitter margin is respectively obtained with 24% and 27% gain settings on the wave form equalizer. This relation between the environmental temperature and the gain settings for the maximal jitter margin is substantially linear as shown in FIG. 3.

In an alternative embodiment according to the current invention, in stead of adjusting the gain of the wave form equalizer, other adjustable components are adjusted to accommodate the temperature differences. For example, these adjustable values and the associated components include a number of delay circuits, an attenuation coefficient for an attenuator, a delay time, and a step in a differentiating circuit. These adjustable components are either a part of the wave form equalizer or belong to other units. In general, these components process an electrical signal that has been converted from an optical signal.

Figure 4:
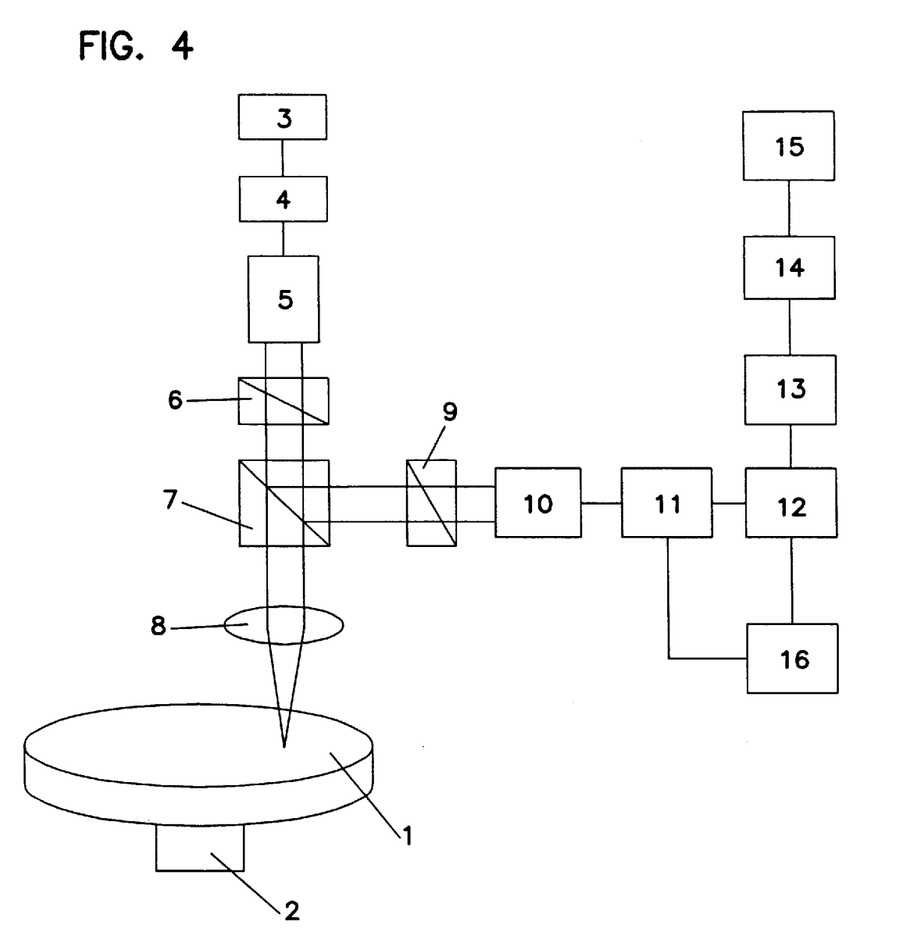
FIG. 4 is a block diagram illustrating another preferred embodiment of the system for optimizing an electronically converted optical signal according to the current invention.

Now referring to FIG. 4, according to another preferred embodiment of the current invention, a temperature measuring unit 16 is connected to both an amplifier 11 and a wave form equalizer 12 and sends a temperature signal indicative of the operational temperature to these components. Based upon the temperature signal, both the amplifier 11 and the wave form equalizer 12 adjust their operations so that the output from each of the components is more accurate. The amplifier 11 and the wave form equalizer 12 are respectively a programmable chip or each have an on-board table containing parameter values in the preferred embodiment as shown in FIG. 4.

Still referring to FIG. 4, the wave form equalizer 12 receives inputs for a boost frequency for selectively increasing the amplitude of certain specified frequency signals representing a short mark and a cut-off frequency and a cut-off frequency for deducing the amplitude of certain other specified signals representing a long mark. In this regard, since both boost and cut-off frequencies depend upon a zone located along the radius of the optical disk, a table in the wave form equalizer 12 contains sets of a boost value and a cut-off value for each zone. However, these sets of the values are determined for a predetermined operational temperature. Accordingly, the selected frequency values are further adjusted based upon the temperature signal by a predetermined adjustment formula. For example, if the boost frequency value stored in the table is determined under the 25° C. condition (BOOST25), at T° C. temperature, the formula $\alpha(T-25)+BOOST25$ is used, where a is a coefficient for adjustment. This adjustment is performed for each zone.

Still referring to FIG. 4, the amplifier 11 is also programmable and is adjusted by a gain value selected from an on-board table containing gain values for predetermined zones. In addition, the amplifier receives a temperature signal from a temperature measuring unit 16, and based upon the temperature signal, the selected gain value is further adjusted by a predetermined adjustment formula. For example, if the gain value stored in the table is determined under the 25° C. condition (GAIN25), at T° C. temperature, the formula $\beta(T-25)+GAIN25$ is used, where $\beta$ is a coefficient for adjustment. This adjustment is performed for each zone.

Figure 5:
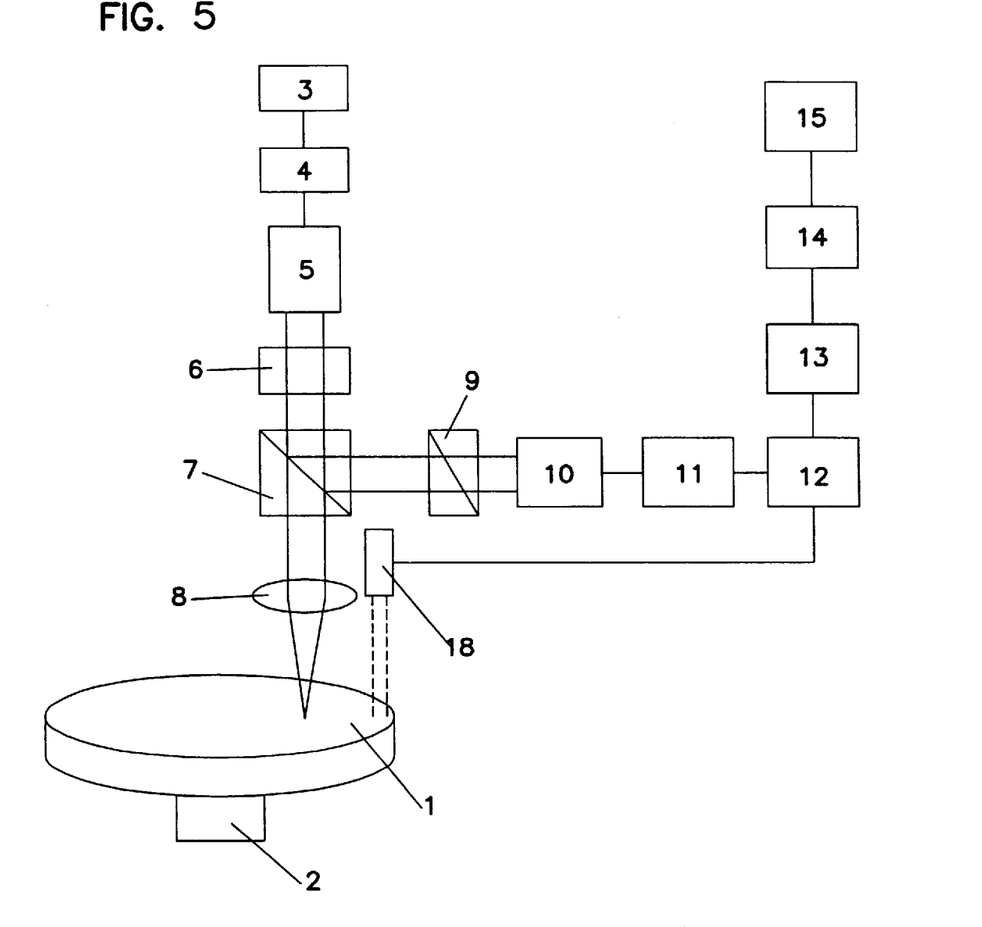
FIG. 5 is a block diagram illustrating yet another preferred embodiment including an optical disk temperature unit for optimizing an electronically converted optical signal according to the current invention.

Now referring to FIG. 5, according to yet another preferred embodiment of the current invention, a disk temperature measuring unit 18 is connected to a wave form equalizer 12 and sends a disk temperature signal indicative of the disk temperature to the wave form equalizer 12. The disk temperature includes a temperature near the surface of the optical disk, a temperature of the surface of the optical disk and a temperature of the disk itself. One example of the disk temperature measuring unit 18 is an infrared heat sensing device located near the optical disk to measure the disk or disk surface temperature. Although the above described environmental temperature is ultimately related to the disk temperature, the directly measured disk temperature is also helpful in adjusting the electrically converted optical signal in the post-conversion adjustment units such as the wave form equalizer 12.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts, as well as implementation in software, hardware, or a combination of both within the principles of the invention to the full extent indicated by the broad general meaning of the terms in which the appended claims are expressed.

What is claimed is:

1. A method of fine-tuning input-output (I/O) operations involving an optical disk medium, comprising the steps of:
   a) measuring an operational temperature;
   b) converting an optical signal representing user data stored on the optical disk medium to an electrical signal; and
   c) adjusting the electrical signal generated in said step b) based upon the measured operational temperature by selectively augmenting an amplitude level of a certain frequency portion of the electrical signal.

2. The method of fine-tuning I/O operations according to claim 1 wherein said operational temperature is an environmental temperature.

3. The method of fine-tuning I/O operations according to claim 1 wherein said operational temperature is taken near the optical disk.

4. The method of fine-tuning I/O operations according to claim 1 wherein said operational temperature is taken on a surface of the optical disk.

5. The method of fine-tuning I/O operations according to claim 1 wherein said operational temperature is an optical disk temperature.

6. The method of fine-tuning I/O operations according to claim 1 wherein said portion is a high-frequency portion of the electrical signal.

7. The method of fine-tuning I/O operations according to claim 1 further comprising an additional steps of:
   d) generating temperature dependent adjustment values prior to said step a);
   e) selecting some of said adjustment values for optimizing said electrical optimal at each of said temperatures; and
   f) storing said selected adjustment values.

8. The method of fine-tuning the I/O operations according to claim 7 wherein said step f) is performed by writing said selected adjustment values on an external memory device.

9. The method of fine-tuning I/O operations according to claim 7 wherein said step d) generates said temperature dependent adjustment values by varying temperature and gain values for selectively increasing an amplitude of a high-frequency portion of said electrical signal.

10. The method of fine-tuning the I/O operations according to claim 7 wherein said step f) is performed by writing said selected adjustment values on the optical disk medium.

11. An optical disk, comprising:
   recordable data portions for storing user data; and
   information storage portions for storing temperature dependent information for adjusting a wave form equalizer, said information being stored as marks for causing optical changes upon an incident light.

12. The optical disk according to claim 11 wherein said information storage portion has a groove, said information is stored as depths changes in said groove.

13. A method of adjusting an electrical signal converted from an optical signal for representing user data stored on an optical disk, comprising the steps of:
   a) reading the data from the disk, a portion of the data including a temperature dependent value selected for the disk; and
   b) selectively increasing an amplitude of a high-frequency portion of the electrical signal based upon the temperature dependent value.

14. A system for adjusting an electrically converted optical signal representing data on an optical disk medium, a laser beam source emitting a laser beam towards the optical disk medium for reading the data thereon, comprising:
   a temperature measuring unit for measuring an operational temperature and generating a temperature signal based upon the measured operational temperature;
   a memory storage for containing a predetermined set of temperature specific adjustment values;
   an optical pick-up unit for receiving the laser beam reflected off a surface of the optical disk medium and converting the laser beam to the electrically converted optical signal defining an electrical signal; and
   a wave form equalizer connected to said optical pick-up unit, said temperature measuring unit and said memory storage for selecting one of the temperature specific adjustment values according the temperature signal and adjusting the electrical signal based upon the selected temperature adjustment value by selectively increasing an amplitude level of a certain frequency portion of the electrical signal.

15. The system for adjusting an electrically converted optical signal according to claim 14 wherein said temperature measuring unit is located near the optical disk medium for measuring the temperature near the optical disk medium.

16. The system for adjusting an electrically converted optical signal according to claim 14 wherein said temperature measuring unit is located near the optical disk medium for measuring the temperature on a surface of the optical disk medium.

17. The system for adjusting an electrically converted optical signal according to claim 14 wherein said temperature measuring unit is located near the optical disk medium for measuring the temperature of the optical disk medium without contacting the optical disk medium.

18. The system for adjusting an electrically converted optical signal according to claim 14 wherein said temperature measuring unit is for measuring an environmental temperature.

19. The system for adjusting an electrically converted optical signal according to claim 14 wherein said memory storage is a part of the optical disk medium.

20. The system for adjusting an electrically converted optical signal according to claim 14 wherein said temperature-specific adjustment value adjusts a filtering characteristics of said wave form equalizer.

21. A system for adjusting an electrically converted optical signal, comprising:
   an optical disk medium storing data, a portion of data being information related to heat characteristics of said optical disk medium;
   a laser beam source emitting a laser beam towards said optical disk medium, the laser beam reflected off a surface of said optical disk medium representing data thereon;
   an optical pick-up unit for receiving the reflected laser beam and converting the reflected laser beam to an electrical signal; and
   a wave form equalizer connected to said optical pick-up unit for selectively adjusting the electrical signal based upon the heat characteristics information by selectively augmenting a certain frequency portion of the electrical signal.

22. A method of adjusting input-output (I/O) operations involving an optical disk, comprising the steps of:

a) storing temperature dependent values;

b) measuring an ambient temperature;

c) retrieving information regarding the optical disk;

d) selecting one of the temperature dependent values based upon a combination of the measured temperature and the retrieved disk information;

e) converting an optical signal representing user data stored on the disk into an electrical signal for a read operation; and g) adjusting the converted electrical signal based upon the selected temperature dependent value in said step d) so as to substantially optimize said read operation by selectively augmenting an amplitude level of a certain frequency portion of the electrical signal.

* * * * *

UNITED STATES PATENT AND TRADEMARK OFFICE
CERTIFICATE OF CORRECTION

PATENT NO. : 5,852,596
DATED : DECEMBER 22, 1998
INVENTOR(S) : SHINICHI KURITA, HIROYUKI MATSUMOTO, MASAHI HORIKAWA AND KOICHIRO ISHII

It is certified that error appears in the above-identified patent and that said Letters Patent is hereby corrected as shown below:

Claim 22 should read as follows:

22. A method of adjusting input-output (I/O) operations involving an optical disk, comprising the steps of:

a) storing temperature dependent values;
    b) measuring an ambient temperature;
    c) retrieving information regarding the optical disk;
    d) selecting one of the temperature dependent values based upon a combination of the measured temperature and the retrieved disk information;
    e) converting an optical signal representing user data stored on the disk into an electrical

UNITED STATES PATENT AND TRADEMARK OFFICE
CERTIFICATE OF CORRECTION

PATENT NO. : 5,852,596
DATED : December 22, 1998
INVENTOR(S) : Shinichi Kurita et al.

It is certified that error appears in the above-identified patent and that said Letters Patent is hereby corrected as shown below:

```
signal for a read operation; and
f) adjusting the converted electrical signal
based upon the selected temperature dependent
value in said step d) so as to substantially
optimize said read operation by selectively
augmenting an amplitude level of a certain
frequency portion of the electrical signal.
```

Signed and Sealed this

Fifteenth Day of June, 1999

Attest:

Q. TODD DICKINSON

*Attesting Officer*  Acting Commissioner of Patents and Trademarks